Patented Sept. 30, 1952

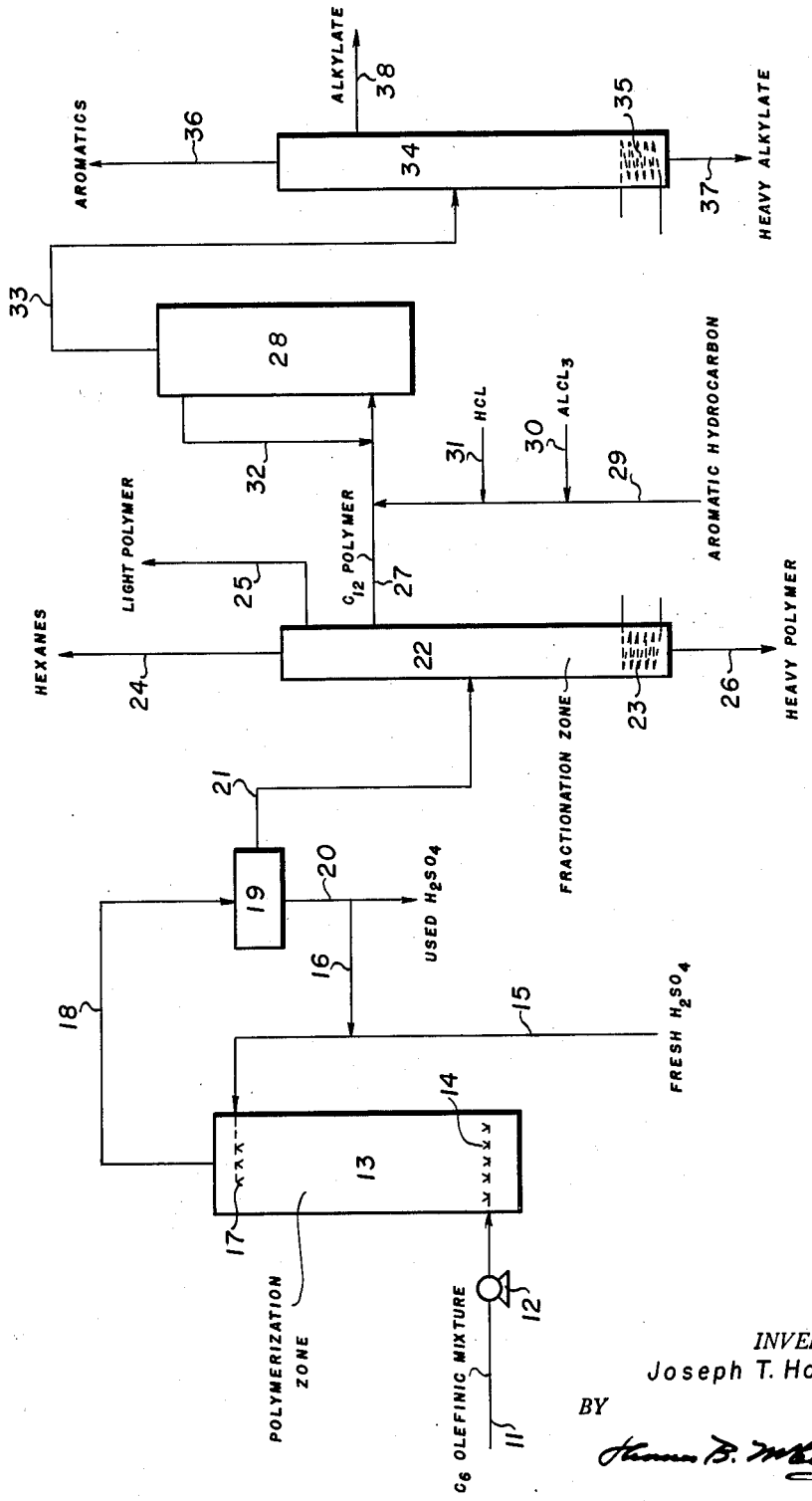

2,612,531

UNITED STATES PATENT OFFICE 2,612,531

POLYMERIZATION OF OLEFINS AND THE ALKYLATION OF POLYMER

Joseph T. Horeczy, Baytown, Tex., assignor, by mesne assignments, to Standard Oil Development Company, Elizabeth, N. J., a corporation of Delaware Application December 6, 1950, Serial No. 199,515

6 Claims. (Cl. 260—671)

The present invention is directed to a method for producing a non-selective polymer. More particularly, the invention is directed to the non-selective polymerization of olefins having 6 carbon atoms in the molecule. The invention is also concerned with the polymerization of olefins having 6 carbon atoms in the molecule and the manufacture of a product which is a raw material suitable for use in the manufacture of detergents.

The present invention may be described briefly as involving the polymerization of an olefinic mixture containing type I, II, III and IV olefins, as typed by Schmitt and Boord in the Journal of the American Chemical Society, volume 54, page 751 (February 1932), having 6 carbon atoms in the molecule, at a temperature in the range between 175° and 225° F. in the presence of a sulfuric acid polymerization catalyst having a titratable acidity no less than 70% $H_2SO_4$ under equilibrium conditions of polymerization. Under these conditions, a polymer is produced in high yields. In accordance with the present invention the polymer may be distilled to recover a fraction containing 12 carbon atoms in the molecule which is then admixed with an aromatic hydrocarbon having 6 to 8 carbon atoms in the molecule to form a feed mixture which may then be contacted with an alkylation catalyst to cause alkylation of the aromatic hydrocarbon with the polymer having 12 carbon atoms in the molecule; the alkylate so formed from the aromatic hydrocarbon and the polymer having 12 carbon atoms in the molecule is a suitable raw material for the manufacture of detergents by sulfonation and subsequent neutralization.

The olefins forming a feed stock of the present invention include the type I olefins, such as hexene-1, the type II olefins, such as cis- and trans-hexene-2 and hexene-3, the type III olefins, such as 2 methylpentene-1, and the type IV olefins, such as 2 methylpentene-2. The feed stock may also include the type V olefins having 6 carbon atoms in the molecule, such as 2,3-dimethylbutene-2. The feed stock will contain also hexanes and may be recovered from catalytic processes, such as catalytic cracking operations. The olefinic mixture may also be recovered from thermal cracking operations or from the product produced by polymerizing thermally propylene and ethylene.

The conditions employed in the polymerization step of the present invention include a temperature in the range between 175° and 225° F., and a sulfuric acid catalyst having a titratable acidity under equilibrium conditions no less than 70% $H_2SO_4$ and preferably in the range between 70% and 75% $H_2SO_4$. The olefinic mixture is contacted with the sulfuric acid catalyst in the strength mentioned for a time in the range between 30 and 60 minutes. Such conditions give an olefinic conversion in the range between about 90% and 100%.

The alkylation conditions include a temperature in the range between 30° and 145° F. and preferably a temperature in the range from 120° to 130° F.; the lower temperature limit is dictated by the choice of the aromatic hydrocarbon employed. Thus when benzene is used as the aromatic hydrocarbon it will be desirable not to go below 30° F. It will be understood that when lower temperatures in the range given are employed, it will be necessary to provide refrigeration facilities. The alkylation catalyst is preferably aluminum chloride promoted with hydrogen chloride although other Friedel-Crafts catalysts which are well known in their use in alkylation reactions may be employed. The amount of aluminum chloride used will vary but satisfactory results may be obtained with about 0.3 pound per gallon of alkylate and the amount used may be in the range from 0.1 to about 0.5 pound of aluminum chloride per gallon of alkylate. The aluminum chloride may suitably be promoted with hydrogen chloride or other hydrogen chloride producing reagents. It will be desirable to employ a minimum of 20 mole per cent of hydrogen chloride based on the aluminum chloride.

The aromatics will be employed with the olefin polymer in a ratio in the range from 3:1 to 10:1 with a preferred ratio of about 5:1.

The invention will be further illustrated by reference to the drawing in which the single figure is a flow diagram of a preferred mode of conducting the invention.

Referring now to the drawing, numeral 11 designates a feed line by way of which an olefinic mixture having 6 carbon atoms in the molecule and containing type I, II, III and IV olefins and hexanes is introduced into the system from a source not shown. The feed in line 11 is pumped thereby by pump 12 into a polymerization zone 13 through jets or other distribution means 14 to contact sulfuric acid in zone 13 having a titratable acidity no less than 70% $H_2SO_4$ under equilibrium conditions. Stating this otherwise, the equilibrium titratable acidity should be no less than 70% $H_2SO_4$. To maintain the strength of the acid at the proper point, fresh sulfuric acid in the range from about 80% to 87% $H_2SO_4$ may be introduced into the system through line 15 in admixture with recycled acid from line 16, the source of which will be described further. The mixture of fresh and recycled acid is discharged into zone 13 through distributing means 17 and contacts the ascending olefinic material. A temperature in the range from 175° to 225° F. prevails in polymerization zone 13 and under the conditions enumerated hereinbefore a polymer is formed which is discharged along with some acid from zone 13 by line 18 into a settling drum 19 which is of sufficient capacity to allow separation by gravity to take place between the polymer and the acid carried over therewith. The recycled acid is withdrawn from separation zone 19 by line 20 and is recycled in part by line 16 to line 15 while another portion may be discharged.

The polymer separated from the acid in zone 19 is discharged therefrom by line 21, washed with a suitable neutralizing agent such as an aqueous solution of sodium hydroxide in means not shown to remove acidity and is then introduced into a fractionation zone 22 which may be a series of fractionating towers but for convenience of description is shown as a single fractionating tower. Fractionating tower 22 is provided with suitable internal baffling equipment, such as bell cap trays, to allow intimate contact between vapors and liquids and allows and insures a separation among the several components of the hydrocarbon feed thereto. Fractionation zone 22 is provided with a heating means illustrated by coil 23 and by adjustment of temperature and pressure therein allows separation of hexanes overhead by line 24 and withdrawal of a light polymer by line 25. Line 26 is provided for removal of heavy polymer while the desirable product including $C_{12}$ polymer is withdrawn from zone 22 by line 27. Line 27 discharges the $C_{12}$ polymer into an alkylation zone 28. Prior to entrance of polymer into alkylation zone 28 it has added to it by line 29 an aromatic hydrocarbon having from 6 to 8 carbon atoms in the molecule to which is added aluminum chloride introduced by line 30 and hydrogen chloride introduced by line 31.

In alkylation zone 28 the catalyst may be in the form of a sludge of aluminum chloride or it may be suitably disposed on a supporting material. Regardless of the type or form of catalyst used in alkylation zone 28, conditions are adjusted therein to allow alkylation of the aromatic hydrocarbon with the $C_{12}$ polymer produced in the polymerization zone. Alkylation zone 28 is provided with a recycle line 32 which allows the product and unreacted material to discharge back into line 27 to recycle to the alkylation zone to cause substantially complete reaction. The product from alkylation zone 28 is withdrawn by line 33 and is discharged thereby, after neutralization in means not shown with an aqueous solution such as sodium hydroxide to reduce the acidity thereof, into a fractionation zone 34 which may be similar to fractionation zone 22. Fractionation zone 34 is provided with a heating means illustrated by coil 35 for adjustment of temperature and pressure conditions therein and to allow separation by line 36 of unreacted aromatics and recovery thereof and withdrawal by line 37 of heavy alkylate. The desired alkylate is recovered by line 38 and may be used for manufacture of detergents by combination of steps well known to the art including sulfonation, neutralization and drying of the neutralized sulfonated product.

The aromatic hydrocarbon employed in the practice of the present invention may be benzene, toluene or xylene. It is preferred, however, to use benzene and toluene since these aromatics allow the production of very desirable alkylates for detergent manufacture.

The invention will be illustrated further by the following example in which a hexene fraction containing type I, II, III and IV olefins, and possibly type V olefins, was polymerized at a temperature in the range from 175° to 225° F. Sulfuric acid having an equilibrium titratable acidity of 73% $H_2SO_4$ was employed. This titratable acidity was maintained by addition of 85% $H_2SO_4$ to the polymerization zone. Under these conditions a polymer yield of 70 volume per cent based on the olefins was obtained. The polymer was fractionally distilled to recover the olefins having 12 carbon atoms in the molecule and this olefinic fraction was admixed with toluene and alkylated at a temperature of 115° F., the toluene to polymer ratio being 5 to 1. A reaction time of 60 minutes was employed using hydrogen chloride promoted aluminum chloride as a catalyst. The yield of alkylate suitable for detergent manufacture was 115 weight per cent based on the olefin. This alkylate was sulfonated and the resulting sulfonate was neutralized with sodium hydroxide. The aqueous solution resulting from the neutralization was adjusted to obtain a mixture containing 60% by weight of sodium sulfate and 40% by weight of sodium sulfonate on a dry basis. This mixture was dried to obtain a white powder. The detersive efficiency of this powder was determined and compared to the efficiency of sodium lauryl sulfonate as a standard. It was found that in concentration of 0.2, 0.3, and 0.4 weight per cent, the detergent produced in accordance with the present invention, in the amounts given, was 100%, 110% and 120%, respectively, as efficient as the sodium lauryl sulfonate. The sudsing characteristics were comparable with the sudsing characteristics of the sodium lauryl sulfonate.

When olefins having 6 carbon atoms in the molecule containing type I, II, III and IV olefins are polymerized under less drastic conditions employing sulfuric acid having a lower titratable acidity than that used in the foregoing example, a polymer yield of only 50 volume per cent based on the olefins was obtained. When the $C_{12}$ fraction from this polymer was employed to alkylate toluene under comparable conditions, the yield of alkylate suitable for detergent manufacture was only 48 weight per cent based on the olefins charged which amounted to 31% of the theoretical yield as compared to 75% obtained in the practice of the present invention. The 31% yield is an extremely low yield and makes a polymerization and alkylation process under other conditions than those of the present invention largely unattractive. The remainder of the olefin was degraded to form low boiling alkylation products which are wholly unsuitable in the manufacture of detergent. In addition, by-products, such as alkyl chlorides, were formed. These by-products cause emulsion difficulties during the caustic washing of the alkylate and also cause severe corrosion difficulties during distillation.

It is believed that the reason improved results are obtained in the practice of the present invention is because under conditions employed in the polymerization step of my invention substantially all of the olefins are polymerized. For example, in a hexane fraction containing about 57% of olefins, 55% of them were polymerized under the foregoing conditions. The conversion of olefins was around 97%. It is thought that the polymer produced under the milder conditions, which allows selective polymerization, undergoes fragmentation during alkylation to produce low molecular weight alkylate which is unsuitable for detergent manufacture.

The nature and objects of the present invention having been fully described and illustrated, what I desire to claim as new and useful and to secure by Letters Patent is:

1. A method for polymerizing a mixture of olefinic hydrocarbons having 6 carbon atoms in the molecule and containing type I, II, III and IV olefins and hexanes which comprises contacting said mixture at a temperature in the range between 175° to 225° F. with sulfuric acid having a titratable acidity no less than 70% $H_2SO_4$ under equilibrium conditions to produce an olefinic polymer containing twelve carbon atoms in the molecule and recovering said polymer.

2. A method for polymerizing a mixture of olefinic hydrocarbons having 6 carbon atoms in the molecule and containing type I, II, III and IV olefins and hexanes which comprises contacting said mixture at a temperature in the range between 175° and 225° F. with sulfuric acid having a titratable acidity in the range between 70% and 75% $H_2SO_4$ under equilibrium conditions for a time in the range between 30 and 60 minutes to convert at least 90% of said olefins and to produce a polymer having twelve carbon atoms in the molecule and recovering said polymer.

3. A method for producing an alkylate suitable for use in the manufacture of detergent which comprises contacting a mixture of olefinic hydrocarbons having 6 carbon atoms in the molecule and containing type I, II, III and IV olefins and hexanes at a temperature in the range between 175° and 225° F. with sulfuric acid having a titratable acidity no less than 70% $H_2SO_4$ under equilibrium conditions to form a polymerized product, distilling said product of said olefins to recover a polymer containing 12 carbon atoms in the molecule, admixing the polymer with an aromatic hydrocarbon having 6 to 8 carbon atoms in the molecule, alkylating the aromatic hydrocarbon in said admixture with the olefinic polymer to form an alkylate and recovering said alkylate.

4. A method for producing an alkylate suitable for use in the manufacture of detergents which comprises contacting a mixture of olefinic hydrocarbons having 6 carbon atoms in the molecule and containing type I, II, III and IV olefins and hexanes at a temperature in the range between 175° and 225° F. with sulfuric acid having a titratable acidity in the range between 70% and 75% $H_2SO_4$ under equilibrium conditions for a time in the range between 30 and 60 minutes to convert at least 90% of said olefins and to produce a polymerized product, distilling said product to recover a polymer having 12 carbon atoms in the molecule, admixing said polymer with an aromatic hydrocarbon having from 6 to 8 carbon atoms in the molecule, the volume ratio of aromatics to olefins being in the range of from 3:1 to 10:1, contacting the admixture with a promoted aluminum chloride catalyst at a temperature in the range between 30° and 145° F. in the liquid phase to alkylate said aromatic hydrocarbon with said polymer and to form an alkylate, and recovering said alkylate.

5. A method in accordance with claim 4 in which the aromatic hydrocarbon is benzene.

6. A method in accordance with claim 4 in which the aromatic hydrocarbon is toluene.

JOSEPH T. HORECZY.

REFERENCES CITED

The following references are of record in the file of this patent:

UNITED STATES PATENTS

| Number | Name | Date |
|---|---|---|
| 2,232,117 | Kyrides | Feb. 18, 1941 |
| 2,289,778 | Herold | July 14, 1942 |
| 2,436,571 | Heinrich | Feb. 24, 1948 |